United States Patent Office 3,345,432
Patented Oct. 3, 1967

3,345,432
FLAME-RETARDANT COMPOSITIONS CONTAINING ORGANOPHOSPHONIC ACIDS
Helen Currier Gillham and Harvey Gerald Klein, Stamford, Conn., assignors to American Cyanamid Company, Stamford, Conn., a corporation of Maine
No Drawing. Filed Aug. 19, 1963, Ser. No. 303,140
20 Claims. (Cl. 260—887)

This invention relates to flame-retardant compositions. More particularly, this invention relates to flame-retardant compositions comprising thermoplastic polymers containing a flame-retarding amount of a phosphonic acid. Still more particularly, this invention relates to flame-retardant compositions comprising thermoplastic polymers containing a flame-retarding amount of a phosphonic acid having the formula (I) $$R-\overset{O}{\underset{\|}{P}}-(OH)_2$$

wherein R represents an aryl radical, an alkyl, polyalkyl or nitro-substituted aryl radical, an aralkyl radical, an ar-alkyl, ar-halo or ar-polyhalo-substituted aralkyl radical or a carboxy, halo or polyhalo-substituted alkyl radical $(C_1-C_4)$.

The use of various materials incorporated into thermoplastic resins in order to improve the flame-retardance thereof is known in the prior art. Many compounds are commercially available for such a use, among them being chlorostyrene copolymers, chlorinated paraffin wax with triphenyl stibine, chlorinated paraffins and aliphatic antimonyl compounds, as well as antimony oxide-chlorinated hydrocarbon mixtures. A drawback, however, of these compounds and mixtures of compounds has been the fact that generally a large amount, i.e. upwards of 35% of the additive must be incorporated into the resin in order to make it sufficiently flame retardant. Also these prior art additives tend to crystallize or oil out of the resin after a relatively short time of incorporation. We have now found a group of compounds which may be added to thermoplastic resins, in relatively small amounts, and still result in the production of satisfactory flame-retardant compositions which do not crystallize or oil out of the resin after incorporation therein.

The production of thermoplastic resin compositions which are flame-retardant, i.e. have high resistance to heat, is of considerable commercial important. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows, etc., and items such as ash trays, waste baskets, fibers and the like are further example of products wherein flame retardance is desirable.

It is therefore an object of the present invention to provide novel flame retardant thermoplastic resin compositions.

It is a further object of the present invention to provide flame retardant compositions comprising thermoplastic polymers and a flame-retarding amount of a phosphonic acid, such as one of those represented by Formula I.

These and further objects will become more apparent to those skilled in the art upon reading the more detailed description set forth hereinbelow.

*The thermoplastic polymers*

The thermoplastic polymers into which the flame retardant agents may be incorporated to produce the novel compositions of the present invention, are generally the vinyl type polymers wherein the monomeric material is polymerized, by any known methods, via the vinyl unsaturation therein. Additionally, thermoset type materials such as the polyester resins, polyurethanes, and the like may be used. Examples of the vinyl type polymers which may be used to form our novel compositions are the acrylates and methacrylates, the vinyl halides, the vinylidene halides, the vinyl acetates, polyvinyl butyral, butadiene copolymers, acrylonitrile-butadiene-styrene polymers, the acrylonitriles, etc. Additionally and preferably, one may incorporate the flame retardant agents mentioned above into such polymers as the α-olefin polymers, such as the homopolymers and copolymers etc. containing, as the major constituent, ethylene, propylene, and the like and the acrylates and methacrylate polymers produced from monomers having the formula (II) $$CH_2=C-C\overset{O}{\underset{R^2}{\diagdown}}\overset{}{\underset{R^3}{\diagup}} $$

wherein $R^2$ is a hydrogen or methyl radical and $R^3$ is a hydrogen or an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and their corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly, the allyl methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -m bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha - methyl - para - methyl styrene, etc.; unsaturated ethers, e.g., ethyl vinyl ether, diallyl ether, etc.; unsaturated amides, for instance, N-allyl caprolactam, acrylamide and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of our novel flame-retardant compositions, are allyl methacrylate, allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said methods of polymerization forming no part of the present invention.

The phosphonic acids

As mentioned above, we have discovered that the addition of phosphonic acids, either singularly or in admixture with one another, to a thermoplastic resin results in the production of a resinous composition having excellent flame-retardant properties. According to the present invention, any phosphonic acid, stable to processing conditions, may be used for this purpose. A preferred group of phosphonic acids, however, are those represented by Formula I. The phosphonic acids may be incorporated into the resins in flame-retarding amounts, i.e. generally amounts ranging from about 2.0%, by weight, to about 35%, by weight, preferably 10% to 25%, by weight, based on the weight of the polymer have been found sufficient.

These phosphonic acids are generally known in the art and can be incorporated into the resin by any known method. That is to say, the flame-retardant phosphonic acid additive may be added to the resin by milling the resin and the acid on, for example, a two-roll mill, in a Banbury mixer etc., or the acid may be added by molding the acid and resin simultaneously, extruding the acid and resin, or by merely blending the resin in powder form with the acid and thereafter forming the final desired article, e.g. the acid may be added to the monomer or a combination of monomer and polymer and the mixture cast to form the final article. Additionally, the phosphonic acid may also be added during the resin manufacture, i.e., during the monomer polymerization procedure, provided the catalyst etc. and other ingredients of the polymerization system are inert in the phosphonic acid.

The phosphonic acids, more specific examples of which are set forth hereinbelow, may be produced in any known manner without varying from the scope of the present invention. Various methods for the production of phosphonic acids of this type are disclosed in, for example, U.S. Patents 2,678,940, 2,717,906, 2,874,184 and 3,032,500. Additional methods are disclosed in articles by Saunders et al., J. Chem. Soc., page 699, 1948; Kosolapoff, Organophosphorus Compounds, John Wiley and Sons Inc., New York, N.Y. Publishers, p. 129 et seq., 1950; Kosolapoff et al., J. Am. Chem. Soc., vol. 69, p. 2020, 1947, and volume 74, p. 4119, 1952, and these patents and references are hereby incorporated herein by reference.

Generally, these procedures result in the formation of the phosphonic acids by one of the following mechanisms:

(1) $RPH_2 + H_2O_2 \longrightarrow R\overset{O}{\overset{\|}{P}}(OH)_2$ (2) $\text{Aryl or alkaryl} + P_2O_5 \longrightarrow \text{aryl or alkaryl-}\overset{O}{\overset{\|}{P}}(OH)_2$ (3) $\text{Aralkyl=Cl} + P(OC_2H_5)_3 \xrightarrow{HCl} \text{aralkyl-}\overset{O}{\overset{\|}{P}}(OH)_2$ (4) $\text{Alkaryl} + PCl_3 + AlCl_3 \xrightarrow{Cl_2} \text{alkaryl-}PCl_2 \xrightarrow{C_2H_5OH}$
$\text{alkaryl-}\overset{O}{\overset{\|}{P}}(OC_2H_5)_2 \xrightarrow{HCl} \text{alkaryl-}\overset{O}{\overset{\|}{P}}(OH)_2$ (5) $(C_nH_{2n}O)_x + PCl_3 + HCl \longrightarrow Cl(C_nH_{2n})_x\overset{O}{\overset{\|}{P}}(OH)_2$ Yields of from 50% to 100% of theoretical are usually recovered, however it is stressed that such procedures form no part of the present invention.

Examples of compounds which are represented by Formula I and are therefore useful in producing the novel compositions of the present invention include:

phenylphosphonic acid,
tolylphosphonic acid,
xylylphosphonic acid,
naphthylphosphonic acid,
benzylphosphonic acid,
p-tolylmethylphosphonic acid,
2-phenylethylphosphonic acid,
1-phenylethylphosphonic acid,
1-phenylpropylphosphonic acid,
2-phenylpropylphosphonic acid,
3-phenylpropylphosphonic acid,
1-phenylbutylphosphonic acid,
2-phenylbutylphosphonic acid,
3-phenylbutylphosphonic acid,
4-phenylbutylphosphonic acid,
1-tolylethylphosphonic acid,
2-tolylethylphosphonic acid,
1-tolylpropylphosphonic acid,
2-tolylpropylphosphonic acid,
3-tolylpropylphosphonic acid,
p-ethylbenzylphosphonic acid,
p-butylbenzylphosphonic acid,
m-propylbenzylphosphonic acid,
p-ethylbenzylphosphonic acid,
2-(p-methylphenyl)ethylphosphonic acid,
2-xylylethylphosphonic acid,
3-naphthylpropylphosphonic acid,
4-naphthylbutylphosphonic acid,
o-, m-, or p-ethylphenylphosphonic acid,
o-, m-, or p-propylphenylphosphonic acid,
o-, m-, or p-butylphenylphosphonic acid,
3-methyl-1-naphthylmethylphosphonic acid,
2-methyl-1-naphthylphosphonic acid,
3-butyl-1-naphthylphosphonic acid,
2,4-dichlorobenzylphosphonic acid,
p-chlorobenzylphosphonic acid,
2-(p-chlorophenyl)ethylphosphonic acid,
3-(p-bromophenyl)propylphosphonic acid,
4-(m-iodophenyl)butylphosphonic acid,
3-(p-fluorophenyl)butylphosphonic acid,
2-(2,4-dichlorobenzyl)ethylphosphonic acid,
3-(2,5-dibromophenyl)propylphosphonic acid,
o-, m-, and p-nitrophenylphosphonic acid,
3-nitro-1-naphthylphosphonic acid,
(carboxymethyl)phosphonic acid,
(2-carboxyethyl)phosphonic acid,
(3-carboxypropyl)phosphonic acid,
(4-carboxybutyl)phosphonic acid,
(2-carboxypropyl)phosphonic acid,
(1-carboxyethyl)phosphonic acid,
(1-carboxybutyl)phosphonic acid,
(chloromethyl)phosphonic acid,
(2-chloroethyl)phosphonic acid,
(3-chloropropyl)phosphonic acid, (4-chlorobutyl)phosphonic acid,
(3-bromobutyl)phosphonic acid,
(2-iodopropyl)phosphonic acid,
(2-fluorobutyl)phosphonic acid,
(1-bromomethyl)phosphonic acid,
(dichloromethyl)phosphonic acid,
(1,2-dichloroethyl)phosphonic acid,
(2,3-dibromopropyl)phosphonic acid,
(1,4-diiodobutyl)phosphonic acid,
(2,4-difluorobutyl)phosphonic acid,
(1,2,3-trichloroethyl)phosphonic acid,
(trichloromethyl)phosphonic acid,
1-(o-ethylphenyl)propylphosphonic acid,
2-(m-propylphenyl)butylphosphonic acid,
p-ethylbenzylphosphonic acid and the like.

It is within the scope of the present invention to incorporate such ingredients as plasticizers, dyes, pigments, stabilizers, antioxidants, antistatic agents and the like to our novel compositions without detracting from the advantageous properties thereof.

The following examples are set forth for purposes of illustration only and are not to be construed as limitations on the present invention except as set forth in the appended claims. All parts and percentages are by weight unless otherwise specified.

Any appropriate flame retardance test may be used to determine the flame retardance properties of any specific compound. One test which is reasonably efficient is that designaed as a modified version of ASTM test D-635-56T. The specifications for this test are: a specimen, 5″ in length, 0.5″ in width and 0.045″ in thickness, is marked at the 1″ and 4″ lengths and is then supported with its longitudinal axis horizontal and its transverse axis inclined at 45° to the horizontal. A Bunsen burner with a 1″ blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4″ mark, the specimen is designated as "self-extinguishing" or "flame-retardant."

EXAMPLE 1

Eighty parts of polyethylene and 20 parts of benzyl phosphonic acid are milled together on a two roll mill at about 170° C. The resulting milled composition is molded into strips 5″ in length, 0.5″ in width and 0.45″ in thickness and said strips are then subjected to an art recognized flame-retardance test. The strips pass the test and are therefore designated as flame-retardant.

Following the procedure of Example 1, examples were carried out utilizing different flame retardant agents and various thermoplastic resin polymers. The results of these examples are set forth in Table I, below. In each instance the resultant plastic-phosphonic acid mixture passed the flame-retardance test and was designated as flame and fire retardant. In the table:

PE=polyethylene;
PP=polypropylene;
PMMA=poly(methyl methacrylate);
PA=poly(acrylic acid);
AN=acrylonitrile;
ST=styrene, and
BD=butadiene.

TABLE I

| Ex. | Polymer | R | Percent |
|---|---|---|---|
| 2 | PMMA | 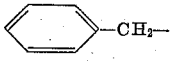—CH$_2$— | 2.5 |
| 3 | PMMA | 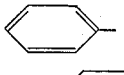— | 2.5 |
| 4 | PE | CH$_3$—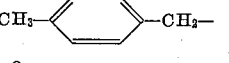—CH$_2$— | 15 |
| 5 | PMMA | 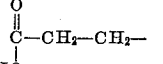 | 20 |
| 6 | PE |  | 25 |
| 7 | PMMA | ClCH$_2$— | 5 |
| 8 | PE | Cl—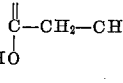—CH$_2$— | 20 |
| 9 | PE | Cl$_3$C— | 30 |
| 10 | PMMA | Cl$_3$C— | 15 |
| 11 | PE | 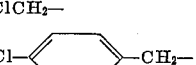—CH$_2$— | 15 |
| 12 | PE | 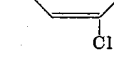 | 30 |
| 13 | PMMA | 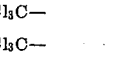 | 15 |
| 14 | PE | CH$_3$—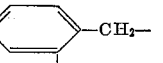— | 30 |
| 15 | PMMA | CH$_3$—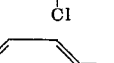— | 15 |
| 16 | PE | 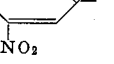 | 20 |
| 17 | PP | C$_2$H$_5$—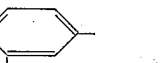— | 25 |
| 18 | PMMA | C$_4$H$_9$—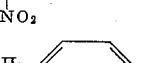— | 15 |
| 19 | PE | CH$_3$—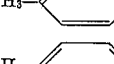— | 30 |
| 20 | PMMA | 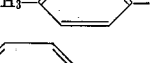 | 20 |
| 21 | PA | 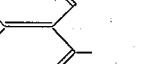—(CH$_2$)$_2$— | 25 |
| 22 | Mixture of BD-AN (10-75%)* and AN-ST (25-90%). | 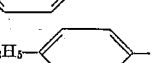—CH$_2$— | 30 |
| 23 | PP | 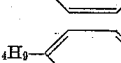—(CH$_2$)$_4$— | 25 |
| 24 | PE | CH$_3$—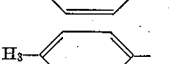—(CH$_2$)$_2$— | 30 |

TABLE I—Continued

| Ex. | Polymer | R | Percent |
|---|---|---|---|
| 5 | PMMA | $C_4H_9$—⟨C_6H_4⟩—$CH_2$— | 25 |
| 6 | Mixture of BD-AN (10-75%)* and AN-ST (25-90%). | Br—⟨C_6H_4⟩—$(CH_2)_2$ | 20 |
| 7 | PE | I—⟨C_6H_3I⟩—$CH_2$— | 20 |
| 28 | PMMA | F—⟨C_6H_4⟩—$CH_2$— | 30 |
| 29 | PP | Cl—⟨C_6H_3Cl⟩—$(CH_2)_4$ | 20 |
| 30 | PMMA | $HOOC-CH_2$— | 20 |
| 31 | PE | $CH_3-CH(COOH)$— | 25 |
| 32 | PP | $HOOC-(CH_2)_4$— | 20 |
| 33 | PMMA | $BrCH_2$— | 5 |
| 34 | PE | $Cl_3CCH_2$— | 20 |
| 35 | MMA/ST/AN 71/19/10. | $I(CH_2)_4$ | 20 |
| 36 | PMMA | $CH_3CHFCH_2$— | 20 |
| 37 | PE | naphthyl-Cl | 25 |
| 38 | PA | $CH_3CHClCHCl$— | 20 |
| 39 | PMMA | ⟨C_6H_5⟩—$(CH_2)_3$ | ......... |
| 40 | Mixture of BD-AN (10-75%)* and AN-ST (25-90%). | ⟨C_6H_3Br⟩—$CH_2$ | 15 |

*U.S. Patent No. 2,439,202.

We claim:
1. A flame-retardant composition consisting essentially of a thermoplastic polymer produced from at least one ethylenically unsaturated monomer and from about 2% to about 35%, by weight, based on the weight of the polymer, of an organophosphonic acid.
2. A flame-retardant composition consisting essentially of a thermoplastic polymer produced from at least one ethylenically unsaturated monomer and from about 2% to about 35%, by weight, based on the weight of the polymer, of an organophosphonic acid having the formula

$$R-\overset{O}{\underset{\|}{P}}-(OH)_2$$

wherein R is selected from the group consisting of an aryl radical, an alkyl, polyalkyl and nitrosubstituted aryl radical, an aralkyl radical, an alkyl halo and polyhalo ring substituted aralkyl radical and a carboxy, halo and polyhalo substituted alkyl radical.
3. A flame retardant composition according to claim 1 wherein the thermoplastic polymer is a polymer of an α-olefin.
4. A flame retardant composition according to claim 2 wherein the thermoplastic polymer is a polymer of an α-olefin.
5. A flame retardant composition consiting essentially of polyethylene and from about 2% to about 35%, by weight, based on the weight of the polymer, of benzylphosphonic acid.
6. A flame retardant composition consisting essentially of polyethylene and from about 2% to about 35%, by weight, based on the weight of the polymer, of p-methylbenzylphosphonic acid.
7. A flame retardant composition consisting essentially of polyethylene and from about 2% to about 35%, by weight, based on the weight of the polymer, of o-chlorobenzylphosphonic acid.
8. A flame retardant composition according to claim 1 wherein the thermoplastic polymer is a polymer of a compound having the formula $$CH_2=C\underset{R^1}{\overset{}{-}}C\overset{O}{\underset{O-R^2}{\diagdown}}$$

wherein $R^1$ is selected from the group consisting of hydrogen and a methyl radical and $R^2$ is selected from the group consisting of hydrogen and an alkyl radical having from 1 to 6 carbon atoms, inclusive.
9. A flame retardant composition according to claim 2 wherein the thermoplastic polymer is a polymer of a compound having the formula $$CH_2=C\underset{R^1}{\overset{}{-}}C\overset{O}{\underset{O-R^2}{\diagdown}}$$

wherein $R^1$ is selected from the group consisting of hydrogen and a methyl radical and $R^2$ is selected from the group consisting of hydrogen and an alkyl radical having from 1 to 6 carbon atoms, inclusive.
10. A flame retardant composition according to claim 1 wherein the thermoplastic polymer is poly(methyl methacrylate).
11. A flame retardant composition according to claim 2 wherein the thermoplastic polymer is poly(methyl methacrylate).
12. A flame retardant composition consisting essentially of poly(methyl methacrylate) and from about 2% to about 35%, by weight, based on the weight of the polymer, of benzylphosphonic acid.
13. A flame retardant composition consisting essentially of poly(methyl methacrylate) and from about 2% to about 35%, by weight, based on the weight of the polymer, of phenylphosphonic acid.
14. A flame retardant composition consisting essentially of poly(methyl methacrylate) and from about 2% to about 35%, by weight, based on the weight of the polymer, of chloromethylphosphonic acid.
15. A flame retardant composition consisting essentially of poly(methyl methacrylate) and from about 2% to about 35%, by weight, based on the weight of the polymer, of trichloromethylphosphonic acid.
16. A flame retardant composition consisting essentially of poly(methyl methacrylate) and from about 2% to about 35%, by weight, based on the weight of the polymer, of p-methylphenylphosphonic acid.
17. A flame retardant composition according to claim 1 wherein the thermoplastic polymer is a mixture of (A) a butadiene-acrylonitrile copolymer and (B) an acrylonitrile-styrene copolymer, the amount of A and B ranging from about 10-75% to 90-25%, respectively.

18. A flame retardant composition according to claim 2 wherein the thermoplastic polymer is a mixture of (A) a butadiene-acrylonitrile copolymer and (B) an acrylonitrile-styrene copolymer, the amount of A and B ranging from about 10–75% to 90–25%, respectively.

19. A flame retardant composition according to claim 1 wherein the thermoplastic polymer is poly(propylene).

20. A flame retardant composition according to claim 2 wherein the thermoplastic polymer is poly(propylene).

References Cited

UNITED STATES PATENTS

| | | | |
|---|---|---|---|
| 2,850,472 | 9/1958 | Jenkins et al. | 260—45.7 X |
| 2,985,617 | 5/1961 | Salyer et al. | 260—45.7 |
| 2,997,454 | 8/1961 | Leistner et al. | 260—45.7 X |
| 3,192,178 | 6/1965 | Basdekis et al. | 260—893 X |
| 3,255,276 | 6/1966 | Winter et al. | 260—30.6 X |

OTHER REFERENCES

Plastics in Engineering, Penton., Cleveland, 1943. TP 98. A2D35, p. 20.

Chem. Abstracts, 5th Decennial Index, Subjects Od–Pn (1961), P. 9566S.

DONALD E. CZAJA, *Primary Examiner.*

L. J. BERCOVITZ, *Examiner.*

M. J. WELSH, *Assistant Examiner.*